(12) United States Patent
Premartin et al.

(10) Patent No.: US 8,047,412 B2
(45) Date of Patent: Nov. 1, 2011

(54) LOAD CARRIERS FOR VEHICLES

(75) Inventors: Arnaud Premartin, Meudon (FR); Olivier Veuillot, Limeil-Brevannes (FR); Hans Odin, Varnamo (SE); Joakim Persson, Jonkoping (SE)

(73) Assignees: Renault S.A.S., Boulogne Billancourt (FR); Thule Sweden AB, Hillerstorp (SE)

( * ) Notice: Subject to any disclaimer, the term of this patent is extended or adjusted under 35 U.S.C. 154(b) by 1024 days.

(21) Appl. No.: 10/567,449

(22) PCT Filed: Jul. 6, 2004

(86) PCT No.: PCT/EP2004/007571
§ 371 (c)(1), (2), (4) Date: May 5, 2008

(87) PCT Pub. No.: WO2005/005204
PCT Pub. Date: Jan. 20, 2005

(65) Prior Publication Data
US 2008/0203750 A1 Aug. 28, 2008

(30) Foreign Application Priority Data

Jul. 11, 2003 (EP) .................................. 03291731
Feb. 25, 2004 (EP) .................................. 04290509
Feb. 25, 2004 (EP) .................................. 04290510

(51) Int. Cl.
*B60P 3/07* (2006.01)
*B60R 9/10* (2006.01)

(52) U.S. Cl. .................. 224/497; 224/42.38; 224/314; 224/502; 224/530; 224/533; 224/549; 224/924

(58) Field of Classification Search ............... 224/42.38, 224/42.39, 314, 319, 324, 495, 497, 502–506, 224/511, 520, 530, 533, 548, 549, 924; 211/201; 410/3
See application file for complete search history.

(56) References Cited

U.S. PATENT DOCUMENTS

| 3,670,935 A | 6/1972 | Hinkston |
| 5,794,828 A * | 8/1998 | Colan et al. ................... 224/530 |
| 2002/0117524 A1 | 8/2002 | Jeong |

FOREIGN PATENT DOCUMENTS

| DE | 296 05 554 | 5/1996 |
| EP | 0 827 866 | 3/1998 |
| EP | 1 095 820 | 5/2001 |

* cited by examiner

*Primary Examiner* — Nathan J Newhouse
*Assistant Examiner* — Adam Waggenspack
(74) *Attorney, Agent, or Firm* — Oblon, Spivak, McClelland, Maier & Neustadt, L.L.P.

(57) ABSTRACT

A load carrier for coupling to a vehicle. The load carrier includes a loading frame and a supporting arch that extends substantially upwardly from and transversely to the loading frame. The supporting arch is divisible into first and second arch parts, each of which arch parts is pivotally coupled to the loading frame such that, when divided, each of the first and second arch parts is configured to be pivoted down to a storage position lying substantially level with the loading frame. The arch parts are configured to be interlocked to each other into an in-use position, in which the first and said second arch parts substantially alone form the supporting arch.

20 Claims, 12 Drawing Sheets

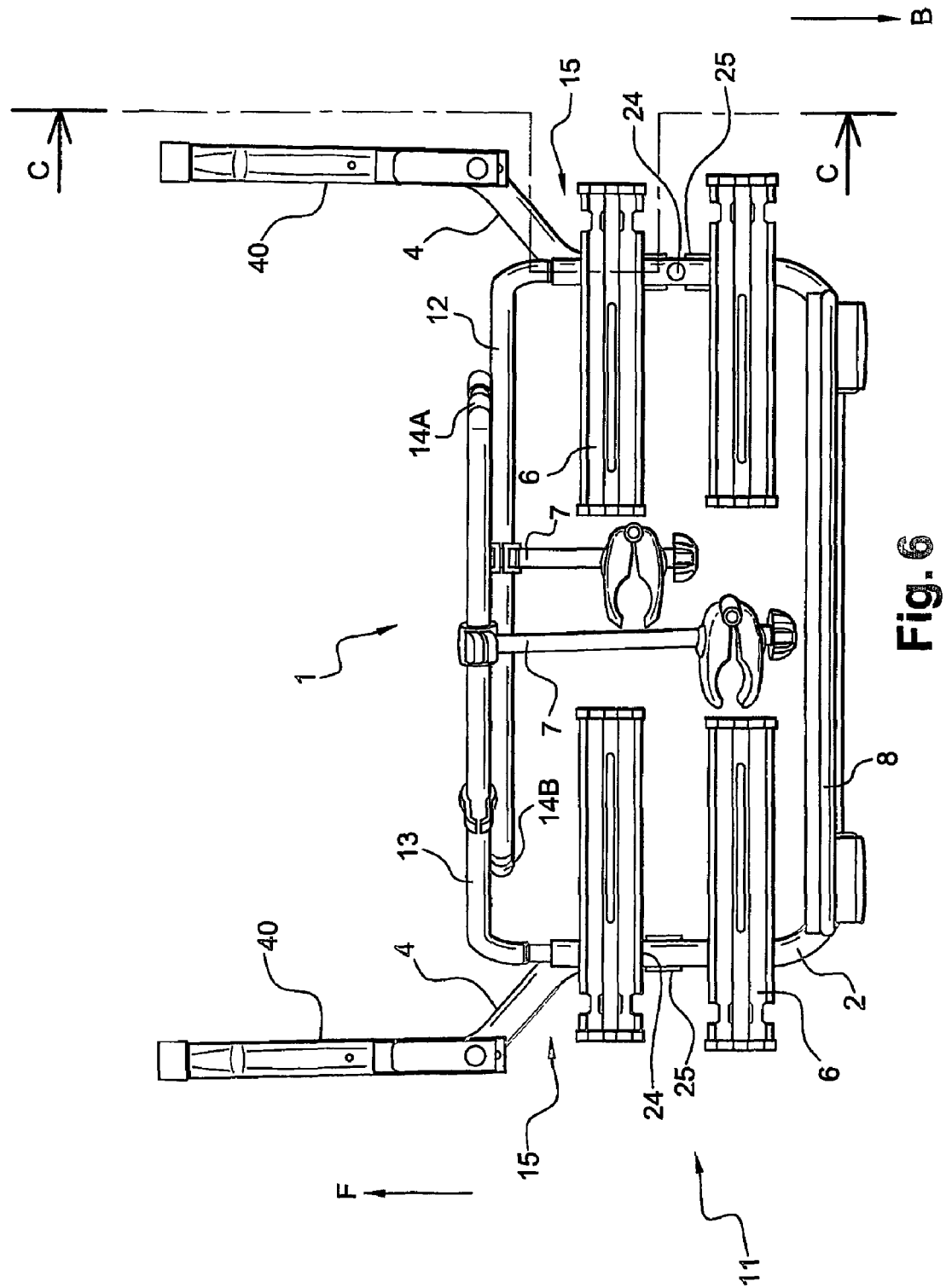

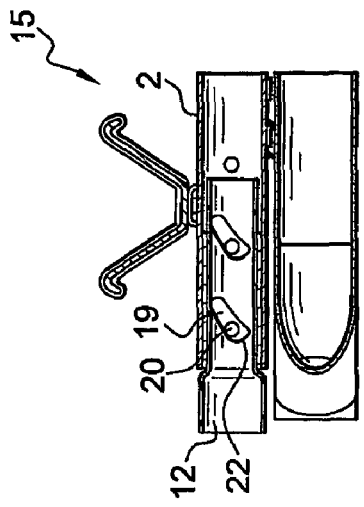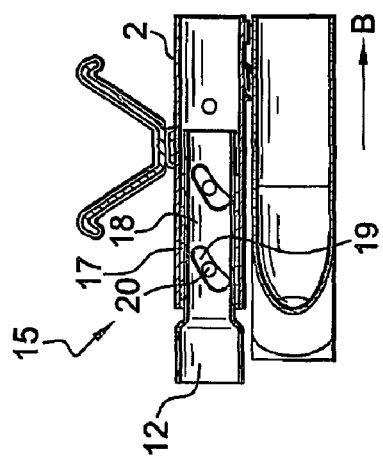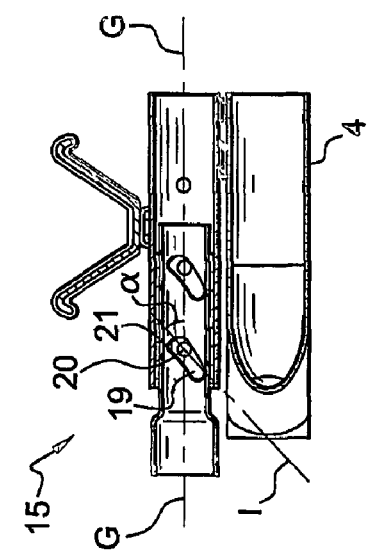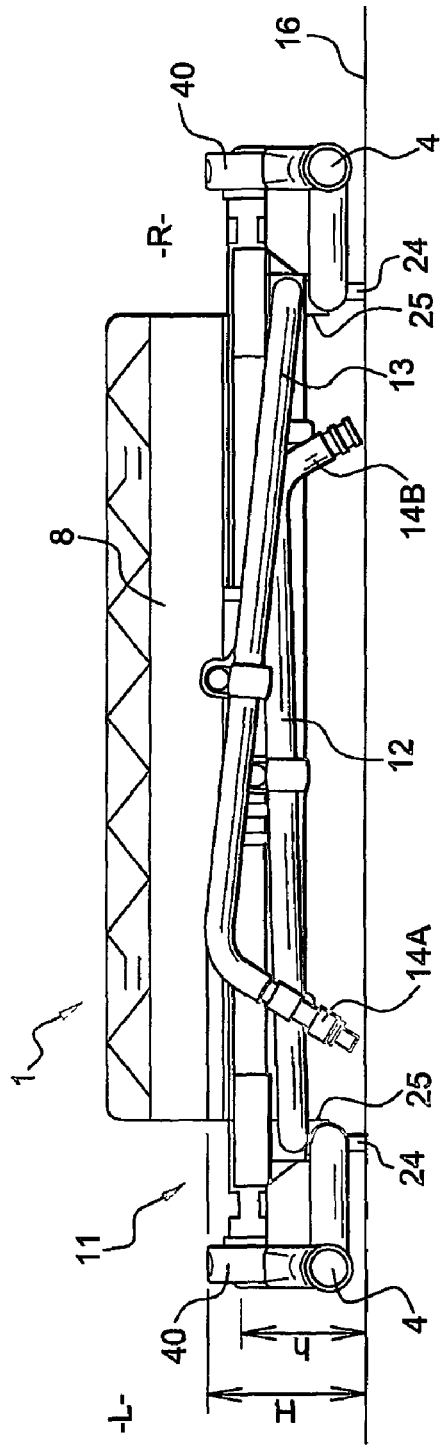

VY E-E

VY D-D

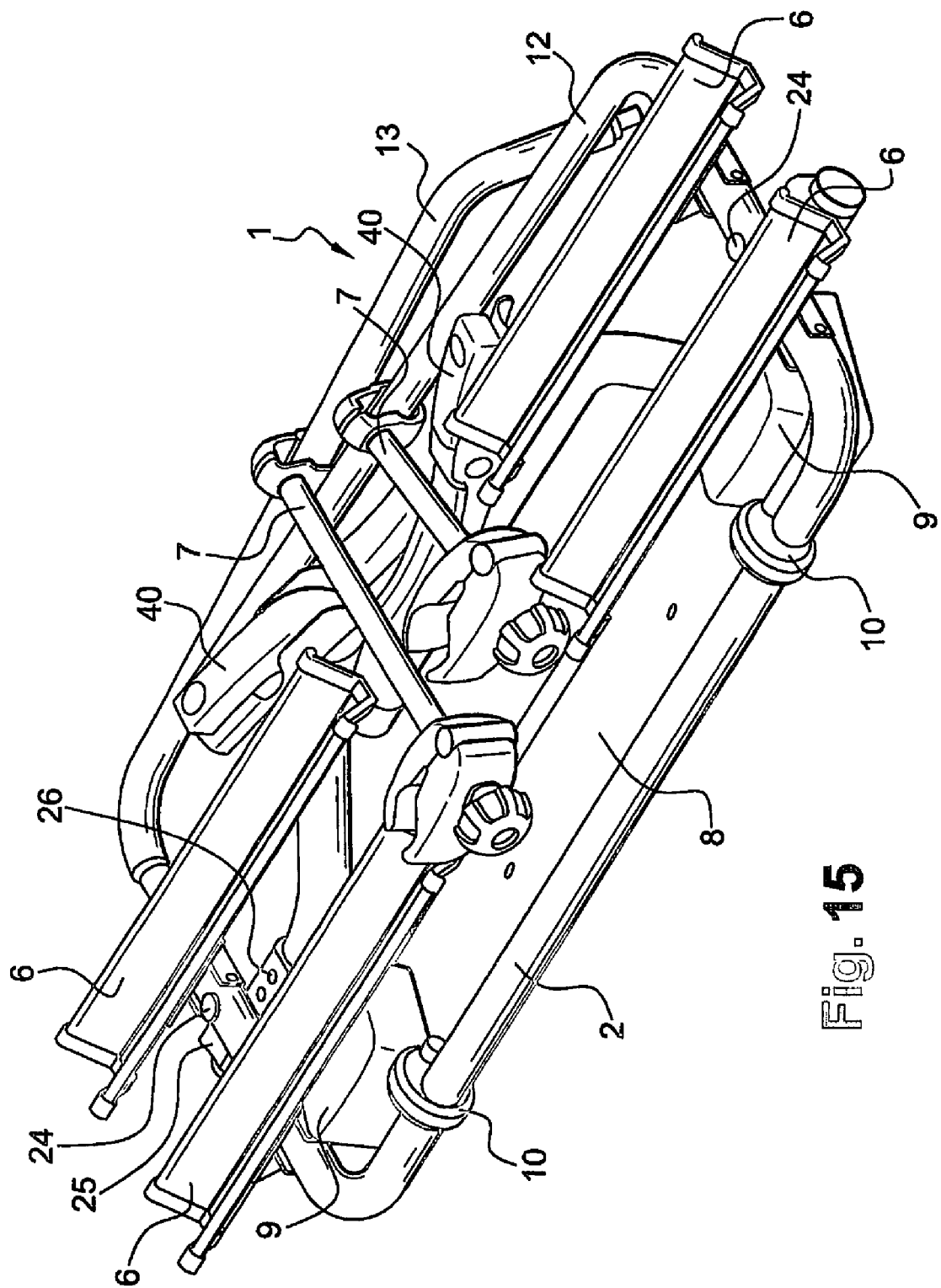

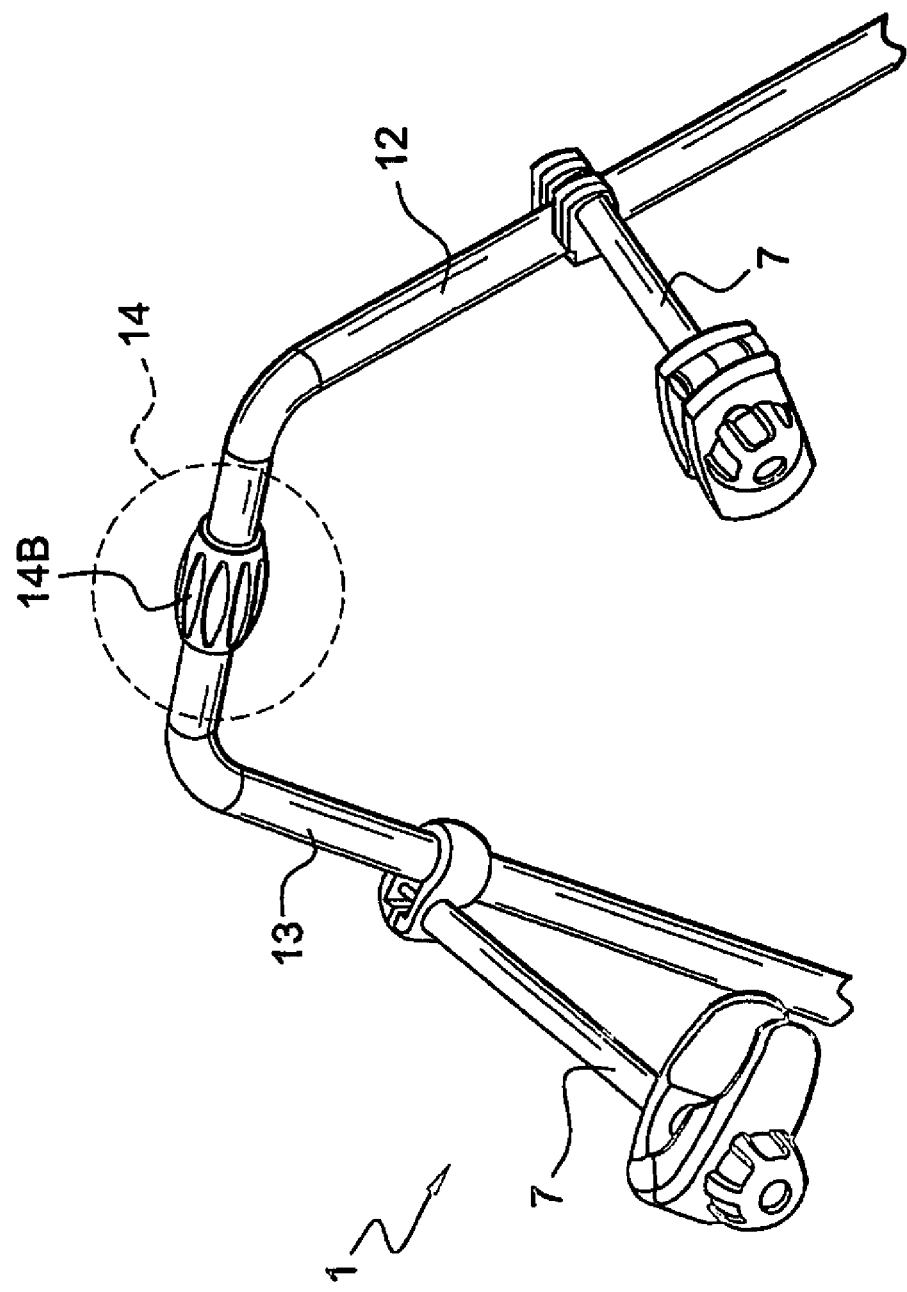

LOAD CARRIERS FOR VEHICLES

BACKGROUND

The present invention relates to a load carriers and in particular to a load carrier for coupling to a vehicle, such as might typically be coupled to the rear of a vehicle for the transport of bicycles or the like.

It is known to provide a load carrier for a vehicle, and one known type of such a load carrier comprises a loading frame and a supporting arch extending upwardly from and substantially transversely to a loading area of the loading frame. This type of load carrier usually further comprises connecting members for coupling the load carrier to the rear of the vehicle.

One particular prior art load carrier is disclosed in EP-1095820, which is adapted for connection to a tow hitch of the vehicle for carrying cargo such as bicycles. An inverted "U" shaped retaining bar rises from a platform of the load carrier and supports some bicycle holders.

One problem with load carriers of the general type under consideration herein is that, when they are not in use, they are extremely bulky and therefore awkward to store or to transport. In order to address this problem, load carriers have been produced in which the retaining bar/supporting arch is tiltable in such a way that it can be folded down over the loading frame. However, the supporting arch is for the most part so high that, when folded down, it extends beyond the platform/loading frame, which means that many of the storage problems continue to exist.

In U.S. Pat. No. 3,670,935 a collapsible cycle carrier is proposed in which a pair of upright support arms are joined to each other by means of a cross-bar which extends between them. The arrangement proposed involves three beams used together to form the cycle support, with multiple pivot points. In collapsing the cycle carrier, it is necessary to first fold the cross bar into the support arm to which it remains attached. It can be seen that, even after detaching the cross bar, at least one preparatory operation is needed before one of the two support arms can be pivoted down. Therefore, at least three pivoting movements are required to collapse this prior art carrier. Furthermore, construction of that arm is complicated and the technique used to connect the crossbar to the other support arm is basic and unsuited to the current market place for such products.

A further drawback with some previous load carriers is that arms used to connect the load carrier to the vehicle take up space when the load carrier is not in use. One prior art load carrier with less than ideal stowage of vehicle connection arms is proposed in WO-94/05526.

There is clearly a continuing need to develop load carriers which are suitable for use with vehicles and which occupy less storage space when not in use than some current types.

BRIEF SUMMARY

It is therefore an object of the present invention to provide an improved load carrier suitable for use with a vehicle.

Accordingly, the present invention provides a load carrier for coupling to a vehicle, said load carrier comprising a loading frame and a supporting arch that extends substantially upwardly from and transversely to said loading frame, said supporting arch being divisible into first and second arch parts each of which arch parts is pivotally coupled to said loading frame such that, when divided, each of said first and second arch parts is configured to be pivoted down to a storage position lying substantially level with said loading frame, characterised in that said arch parts are configured to be interlocked substantially directly to each other into an in-use position in which said first and said second arch parts substantially alone form said supporting arch.

In this manner, a collapsible arch is provided that comprises few components and that is easy to manufacture and easy for a user to assemble or disassemble.

When unlocked from said in-use position, said first and second arch parts may be substantially immediately pivotable by a single movement for each into their respective said storage positions. This saves time and keeps the operation easy for a user. The converse is also true for erection of the arch.

Said pivotal coupling between said arch parts and said loading frame may be configured such that said arch parts, when they are pivoted, are shiftable laterally relative to each other by such a distance that said arch parts are pivotable without giving rise to pivot-blocking contact therebetween. Said lateral shift may be implemented automatically when said arch parts are pivoted. Each said arch part may be configured to shift laterally away from the other when being pivoted.

Said pivotal coupling may comprise a cam or groove and follower mechanism. Said pivotal coupling may comprise a shaft or tube portion that is rotatable in a sleeve portion, in which arrangement one of its parts defines a groove that interacts with a pin disposed in the other part and which groove has an inclination relative to the longitudinal axis of said pivotal coupling, with the effect that said parts of the shaft/tube and sleeve arrangement shift automatically relative to each other along the longitudinal axis of said pivotal coupling when the associated said arch part is pivoted.

When said arch parts are in their respective said storage positions, said arch parts may occupy substantially the same height as said loading frame. When said arch parts are in their respective said storage positions, said arch parts may lie at least partially on top of said loading frame.

Said first arch part and said second arch part may be configured to be interlocked directly to each other by closure of a manually operable coupling that comprises a first coupling part integrated with said first arch part and a second coupling part configured to co-operate with said first coupling part and integrated with said second arch part. Said coupling may comprise manually operable quick-release coupling. Said coupling may be configured for tool-free locking or unlocking. Said coupling may comprise a screw joint. Said screw joint may comprise a male portion integrated with one said arch part and a female portion integrated with the other said arch part, said female portion being configured to substantially envelope said male portion when said screw joint is closed. A female portion of said screw joint may comprise a hand-grip for manual twist release of said screw joint.

Said arch parts and said loading frame may comprise hollow and preferably tubular members. Said load carrier may comprise a bicycle carrier. The present invention also provides a kit of parts configured to be assembled into a load carrier according to any the present invention and a load carrier assembled from a kit of parts according to the present invention.

BRIEF DESCRIPTION OF THE DRAWINGS

The present invention will now be described by way of example only, with reference to the accompanying figures, in which:

FIG. 6 is a plan view of the arrangement depicted in FIG. 3;

FIG. 7 is a sectional view taken from the line A-A in FIG. 4;

FIG. 8 is a sectional view taken from the line B-B in FIG. 5;

FIG. 9 is a sectional view taken from the line C-C in FIG. 6;

FIG. 10 is a rear view of the arrangement depicted in FIGS. 3 and 6;

FIG. 15 is a perspective view of the load carrier of the previous figures shown with its supporting frame collapsed and its coupling members in the folded-in position, this view showing the load carrier in a fully collapsed state suitable for storage; and FIG. 16 is a perspective view of part of FIG. 1 and showing a modified arch coupling.

DETAILED DESCRIPTION

Figure 1:
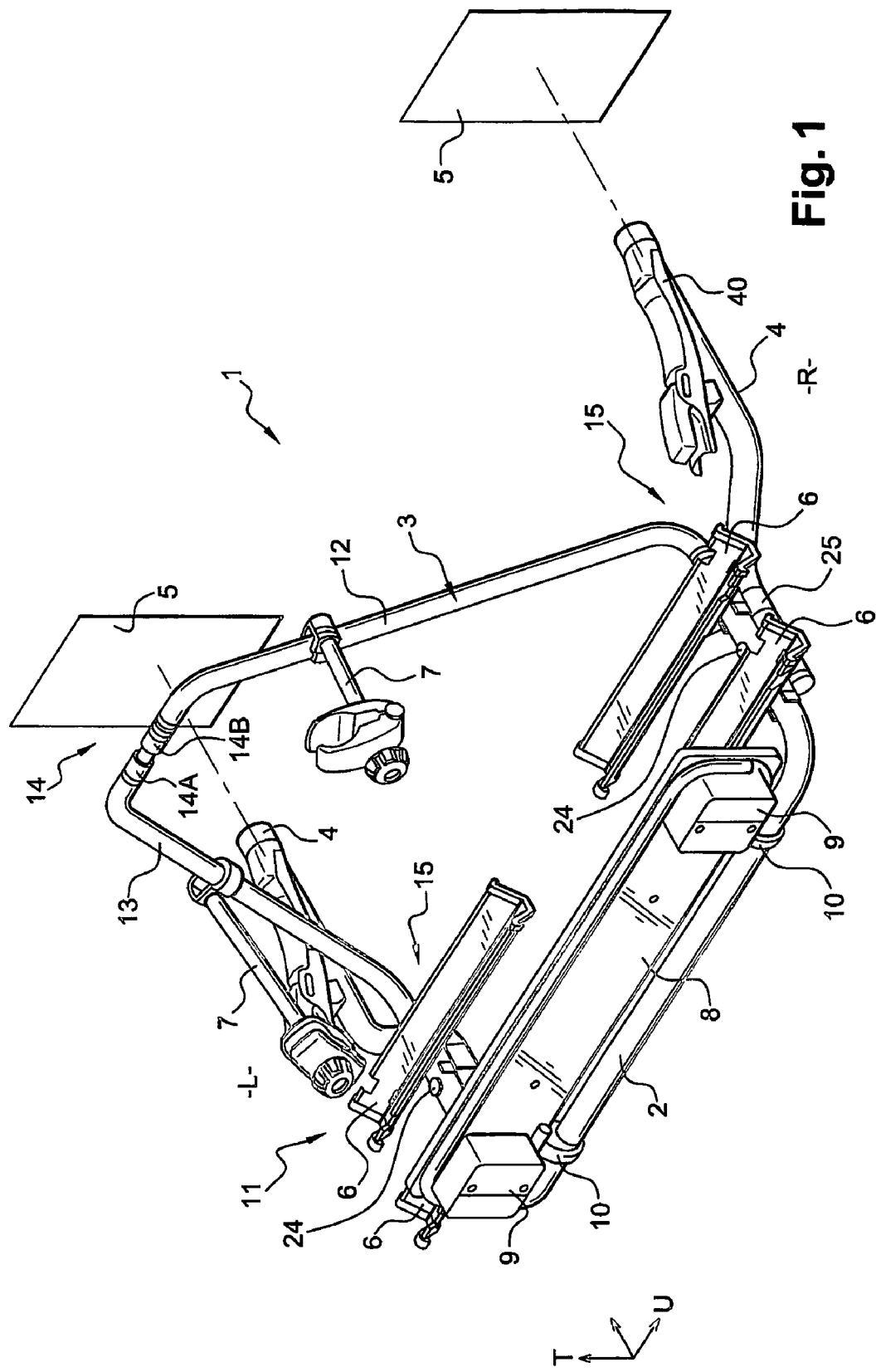
FIG. 1 is a perspective view of a load carrier according to an embodiment of the present invention in a fully assembled state ready for use.
Figure 4:
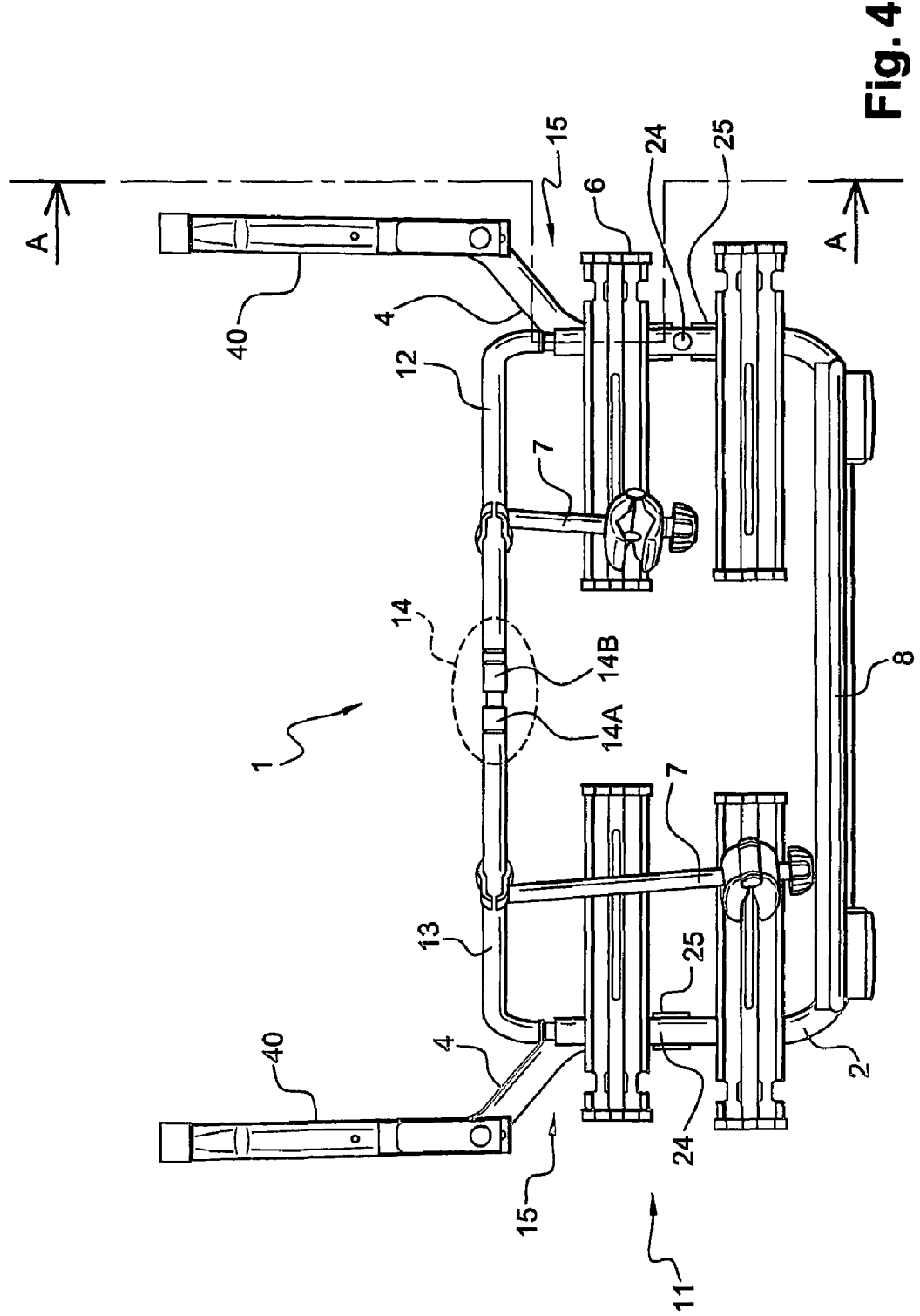
FIG. 4 is a plan view of the arrangement depicted in FIG. 1.

Referring to the figures, and in particular for the moment to FIGS. 1 and 4, a load carrier 1 according to an exemplary and non-limiting embodiment of the present invention is illustrated in a fully assembled state. The load carrier 1 comprises a loading frame 2, a supporting arch 3 and connecting members 4. Each of these parts 2, 3, 4 may be made from a round section material, for example from tubular metal. The load carrier 1 is intended to be connected by its connecting members 4 to a vehicle 5, preferably to its rear, which vehicle 5 is represented in the figure only by two rectangles 5. For connection to the vehicle, the connecting members 4 are provided at their vehicle-connection end with a manually operated coupling mechanism 40, each of which is configured to co-operate with an associated mounting point 5 of the vehicle.

Fitted to, or integrated with, the loading frame 2 are cargo members forming a cargo loading area 11. One example of the sort of cargo members envisaged are channels or rails 6 on which the bicycles transported (not shown in the figures) can be loaded. It will be appreciated that the loading frame 2 and loading area 11 may take other forms in variations to the present invention in dependence on the type of cargo/load to be carried. The spread plane of the loading area 11 is marked with the angular arrow U and the direction of the assembled supporting arch 3 with the arrow T. The load carrier 1 may be regarded in the drawings as ready for fitting to the rear of a vehicle and for convenience is provided in plan view with an indication of what will therefore be facing the right "R" and left "L" sides of that vehicle.

The supporting arch 3 when assembled into its in-use position extends substantially upwardly from the loading frame and substantially transversely relative to its spread plane U, for illustration of which reference may be made in particular to FIG. 1.

The supporting arch 3 carries distancing arms/load support arms 7, which in use are intended to be coupled to loaded bicycles to hold these in an upright position in association with the or each rail 6. In other versions, these load support arms 7 may be embodied in other forms in dependence on the type of cargo/load to be carried, e.g. they may comprise ski-racks, clips or similar load restraining members. At their arch-connecting end, the arms 7 in the present embodiment comprise a clamping ring that can be loosened and displaced around the arch 3 so as to vary the position of the support provided to the load. At their load supporting end, the arms 7 include a load attachment member, embodied for the present bicycle-carrying embodiment in the form of a pair of jaws hinged to close around a bicycle frame member and clamped on by a manually turned knob. One arm 7 is provided by way of example per rail 6 or row of rails and the distance it extends away from the arch 3 depends on the position of the rail 6 with which it is associated.

For the rear mounted embodiment under consideration, a plate is fitted to the loading frame 2 in the form of a lighting board 8, to which lamps 9 are fitted and on which there is space for a number plate (not shown in the figure). This mimics the rear lamps of the vehicle 5 and improves safety for following road users. The lighting board 8 is connected to the loading frame 2 with rotary couplings 10, by which the lighting board 8 can be folded down against the loading frame 2 to help in keeping the collapsed package size down, e.g. for storage of the load carrier 1.

The supporting arch 3 may be a substantially inverted "U" in shape and comprises a first supporting arch part 12 and a second supporting arch part 13. These arch parts 12, 13 are divisibly connectable such that they are interlocked when the arch 3 is in at least its in-use position. The arch parts 12, 13 are not, however, permanently interlocked and the arch 3 can be divided into its separate main parts 12, 13, e.g. at least for the purposes of collapsing the arch 3 for space-efficient storage or stowage of the load carrier 1.

The arch parts 12, 13 are interlocked into the arch 3 by a preferably manually operable coupling. In the present embodiment, this coupling is in the form of a screw joint 14 in which one arch part 13 includes a male fastener 14A that is adapted to screw into an aligned female fastener 14B so as the hold the two arch parts 12, 13 together into the arch 3.

The arch parts 12, 13 are interlocked substantially directly to each other, the only intermediary being the actual locking mechanism 14 whose component parts 14A, 14B are integrated with those arch parts 12, 13. This means that the arch parts 12, 13 alone form the whole arch 3 and there is no need for additional components such as for example a crossbar. The direct interlocking between the arch parts 12, 13 means that, upon unlocking, the first and second arch parts 12, 13 are substantially immediately ready to be pivoted down into their storage positions, which keeps to a minimum the number of actions and time required of a user and furthermore keeps manufacturing complexity down and therefore also keeps costs down.

Referring for the moment to FIG. 16 and in a modification to the embodiment illustrated in FIG. 1, the female part 14B may screw over the top of the male part 14A. In this version, use of a large diameter hand grip on the outside of the female part 14A may prove useful for increasing the mechanical advantage and therefore torque available when trying to undo a particularly tightly done up coupling. Some users may also find it preferable to use a large hand grip during twist release of the coupling 14. Furthermore, in this arrangement if the female part 14B envelops the male part 14A protection of a thread or equivalent against the elements and contamination may be improved, e.g. against frost damage. This variation may be applied to any version of the present invention and in particular to the specific but non-limiting embodiment disclosed herein and with reference to the other figures.

It will be appreciated that other forms of coupling may be used such as a releasable snap-fit coupling, e.g. releasable bayonet joint. In whatever form the coupling 14 is embodied, for user convenience it may prove advantageous to design the coupling 14 such that it is adapted to be connectable and divisible without normally needing the aid of tools, neither of a special nor general variety. The coupling 14 is preferably disposed in a substantially central upper region of the arch 3 so as to keep the length of the arch parts approximately the same, which may prove aesthetically more pleasing to users than widely different lengths of arch part 12, 13.

Figure 2:
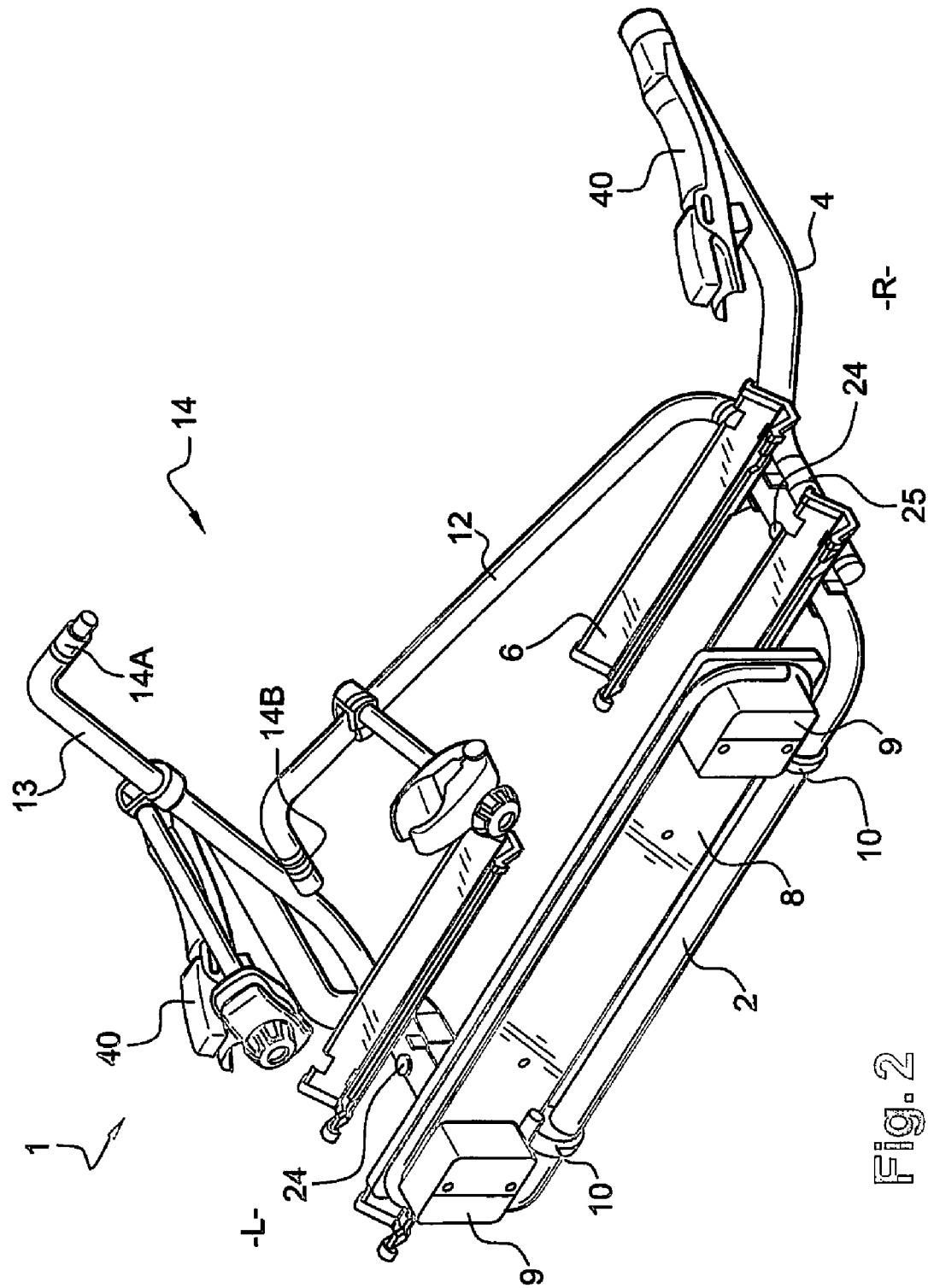
FIG. 2 is a perspective view of the load carrier of FIG. 1 with a support arch thereof in a partially disassembled state.
Figure 3:
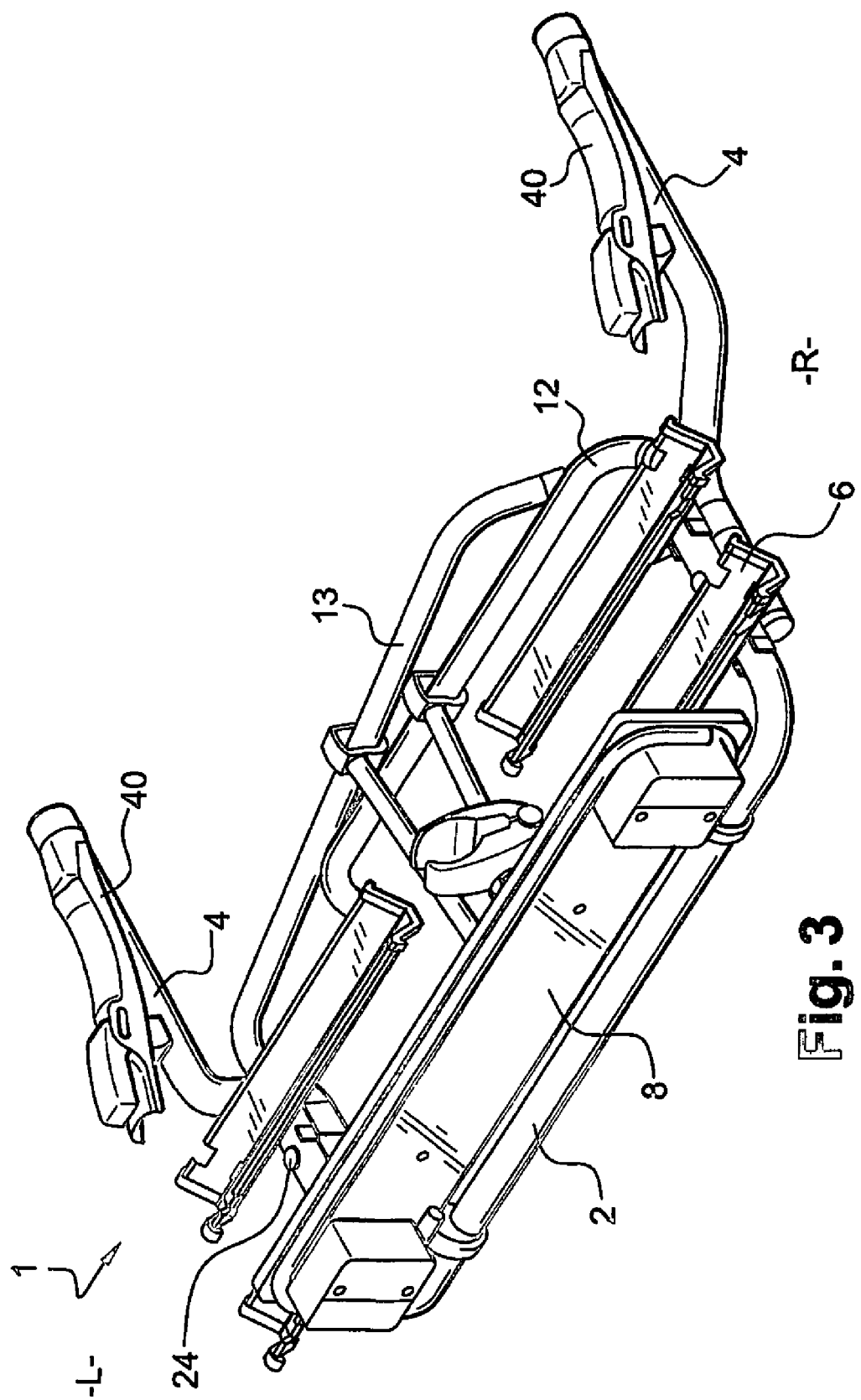
FIG. 3 is a perspective view of the load carrier of FIG. 1 with a support arch thereof in a fully disassembled state and stowed in a storage position.

The supporting arch parts 12 and 13 are each rotatably coupled to the loading frame 2 with a joint comprising a respective sleeve-shaft/tube arrangement 15. When the arch 3 has been divided into its constituent parts 12, 13, these parts 12, 13 can be pivoted about their lower end to a plane H lying essentially level with the loading frame 2. A first stage in this operation can be seen by referring in particular to FIGS. 2 and 5, in which the arch 3 has been divided by unscrewing the coupling 14. The first and second arch parts 12, 13 have been manually separated and partly pivoted down towards the plane H. The first and second arch parts 12, 13 can be seen fully pivoted down into the plane H with particular reference to FIGS. 3 and 6. The plane H is preferably substantially co-planar with the plane of the loading frame 2 and may lie to the rear thereof, i.e. on the vehicle-facing side of the load carrier. Both the arch parts 12, 13 may remain in substantially the same vertical plane at all times while being pivoted downwards, that vertical plane being substantially the same vertical plane in which otherwise lies the assembled and undivided arch 3.

Figure 5:
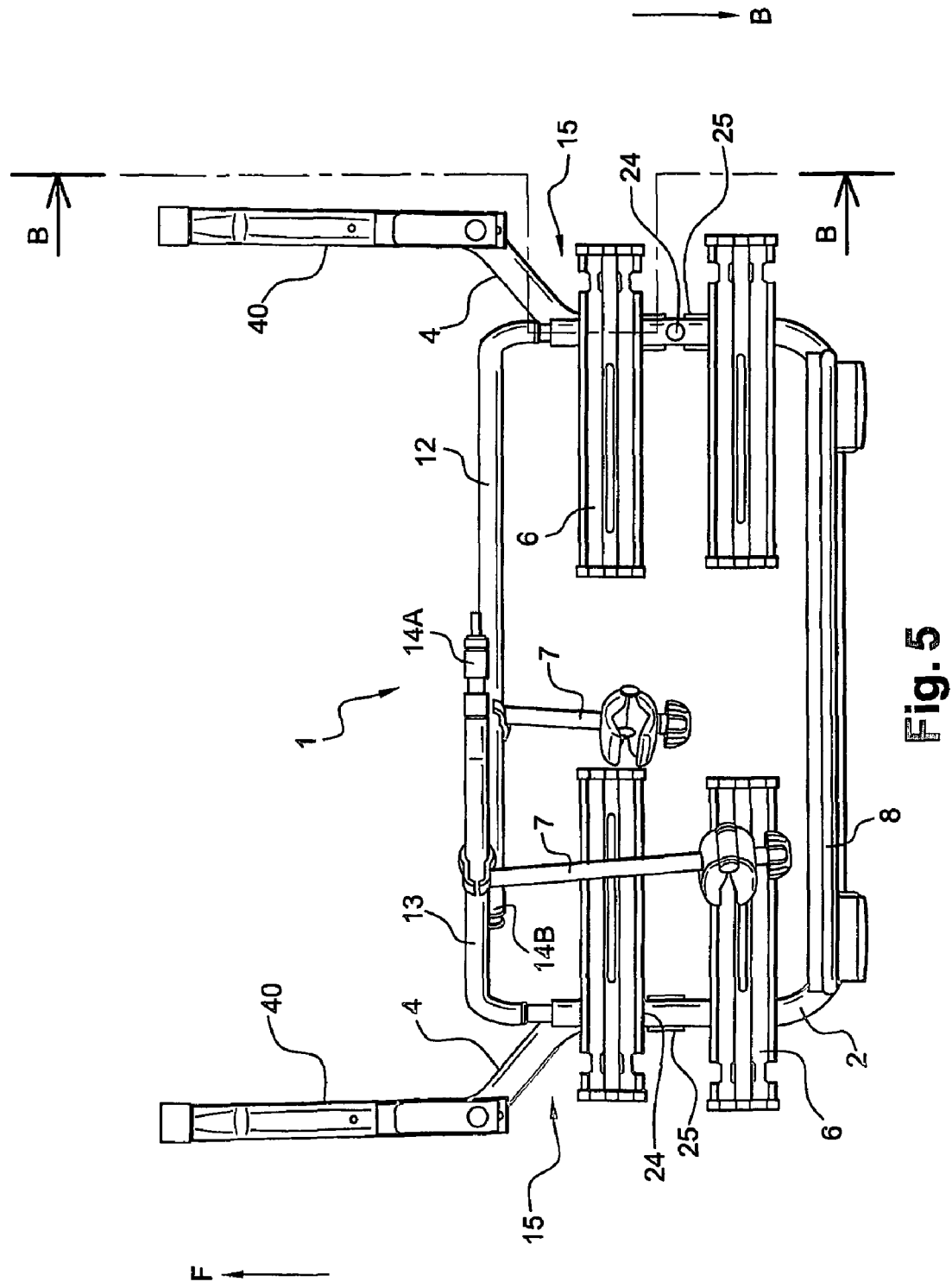
FIG. 5 is a plan view of the arrangement depicted in FIG. 2.

Referring now also to FIGS. 4 to 6, it can be noted that the supporting arch parts 12, 13 preferably move apart in a lateral direction relative to each other when the supporting arch parts 12, 13 are moved down towards the plane H. This could be achieved in a simple embodiment merely by an arrangement in which one part or both 12, 13 can slide into and/or out of the loading frame 2. Such a simple arrangement would call for a user to pull or push the frame parts 12, 13 to gain the necessary clearance to prevent blocking between the arch parts 12, 13 when pivoting and that might cause some user confusion or inconvenience. It is therefore considered preferable if relative lateral displacement during pivoting is performed automatically away on lowering the arch parts 12, 13 and towards each other on raising. That is achieved by way of non-limiting example in the illustrated embodiment.

In FIG. 4 the parts are in a coupled-together position and in FIG. 5 the parts have been detached from each other and partially folded down. In different embodiments, only one or both arch parts 12, 13 could be displaced towards or away from the loading frame 2 to provide the necessary clearance. In the present embodiment, both arch parts 12, 13 are displaced, one arch part 12 towards the loading frame 2 and the other arch part 13 away from the loading frame 2. Thus, as can be seen from FIG. 5, one supporting arch part 12 has moved in the lateral direction relative to the other supporting arch part 13 in the direction marked by the arrow B, whilst the other part 13 has moved relative to the supporting arch part 12 in the direction marked by the arrow F.

In FIG. 6 the supporting arch parts 12, 13 have been fully folded/pivoted down and the arch parts 12, 13 have continued to move sideways relative to each other. It can thus be seen that, once divided, the arch parts 12, 13 do not make pivot-blocking contact with each other during movement into the plane H. The same happens in reverse during assembly of the arch 3 into its in-use position, in which case pivot-blocking contact is only and deliberately made when the two arch parts 12, 13 meet and are interlocked to form the arch 3. One advantage of displacing both arch parts 12, 13 rather than just one of them is that, if only one is displaced sideways from the other, the one that moves must move a long way and must do so early on during the pivoting operation. A long overhang resulting from displacing just one arch part 12, 13 may weaken its joint 15 by amplifying the effect thereon of any accidental load placed on that arch part 12, 13, e.g. after disassembly and full collapse of the arch 3.

FIG. 10 shows the load carrier 1 viewed from the side intended to be connected to the vehicle 5, which may for convenience be referred to as a rear view of the load carrier 1 in its collapsed state. The bottom plane of the load carrier 1 is marked by the line 16 and the supporting arch parts 12, 13 are in their pivoted-down position. The lighting board 8 is still in its non-folded-down position and the height of the loading area 11 above the bottom plane is marked by "h" and the height of the supporting arch parts 12, 13 above the bottom plane by H. These heights h, H may be considered as the thickness of the planes that envelope the loading area 11 and the pivoted down arch parts 12, 13 respectively. These dimensions h, H are preferably similar in value.

Sectional views taken from the lines A-A, B-B and C-C in FIGS. 4, 5 and 6 may be seen by particular reference to FIGS. 7 to 9. In these figures, the shaft-sleeve arrangement 15, by which the supporting arch part 12 is coupled to the loading frame 2 is shown in detail, along with an exemplary and preferred arrangement by which the or each arch part 12, 13 may be displaced sideways with respect to its counterpart.

The broad idea of displacing the first and second arch parts (12, 13) away from each other may be achieved for example by use of a cam or groove and an associated follower. The specific but non-limiting embodiment is directed to the illustrated arrangement 15 which is used to couple the part 12, but it will be appreciated that the description is also applicable mutatis mutandis for the arrangement used to couple the part 13 to the loading frame 2. The difference between the arrangements for the arch parts 12, 13 is that preferably one 12 should automatically move inwards towards the loading frame 2 and the other should automatically and preferably substantially simultaneously move outwards away from the loading frame 2. This minimises the actual movement in and/or out of each part and should make for greater user comfort and component durability.

A sleeve 17 is used in the embodiment illustrated, which may constitute an integrated part of the loading frame 2 and may be an open end of a tubular member used in the construction of that loading frame 2 itself. The sleeve 17 could also be a separate part that is fastened to the load carrier 1. In the sleeve 17, a shaft 18 is introduced that constitutes an end part of the supporting arch part 12. The shaft part 18 can be rotated in the sleeve 17 and the shaft part 18 and the sleeve 17 thus have a common fulcrum and common longitudinal axis, which is marked by the dash-dot line G-G in FIG. 7.

The shaft part 18, which may be tubular, defines therethrough one or more grooves 19 (two illustrated) whose longitudinal lines of action have been marked by the dashed line H-H. The line H-H has an inclination α to the line G-G. Fitted to the sleeve 18 are one or more pins 20, one each of which extends into and interacts with each grooves 19. While the embodiment illustrated shows two pins 20 and grooves 19 per arch part 12, it will be appreciated that one or more pins 20 and corresponding grooves 19 may be used or an equivalent thereto.

In FIG. 7 the supporting arch part 12 is in its raised position and coupled together with the other arch part 13 to form the closed arch 3 and the pins 20 are disposed in a first end position 21 of their grooves 19. In FIG. 8 the arch part 12 has been partially pivoted down and the shaft 18 has been rotated in the sleeve 17. The groove 19 and the pin 20 have therefore interacted such that the shaft 18 has been partially and automatically moved further into the sleeve 17 in the direction shown by the arrow B. In FIG. 9, the arch part 12 has been pivoted fully down and the shaft 18 has moved further in the direction of the arrow B. In the position shown in FIG. 9, further rotation of the shaft 18 is blocked by the fact that the other end 22 of the grooves 19 comes into contact with the pins 20.

The pivotal mounting of the connecting members 4 directly to the loading frame 2 will now be described, with reference in particular to FIGS. 11 to 14. The connecting members 4 may each comprise an arm including a pipe part 23, which is connected to the loading frame 2 by means of a screw joint 24. The screw joint 24 serves as a rotation shaft for the connecting member 4, so that it can fold inwards to a stowage position.

For mounting the load carrier 1 onto the vehicle, the connecting members 4 are moved into an in-use position in which they project outwards away from the loading frame 2 and towards the vehicle. The connecting members 4 are illustrated captured in this position in for example each of FIGS. 1 to 6. The pivotal connection provided by the screw joint allows the connecting members 4 to be pivoted between this in-use position and a stowage position that is in the region of the loading frame 2, i.e. near to it which can include positions next to or alongside it. The connecting members 4 are, however, preferably stowed underneath the loading frame 2. There, they do not interfere with the storage position of the collapsed arch 3, 12, 13. Partly in order to facilitate this, the connecting members are mounted onto the underside of the loading frame 2, for which see for example FIG. 10. In addition, under-slung mounting of the connecting members 4 ensures that the weight of the load bears downwards onto the connecting members 4 and the pivotal connection 24 takes none of the carrier load in tension.

Figure 11:
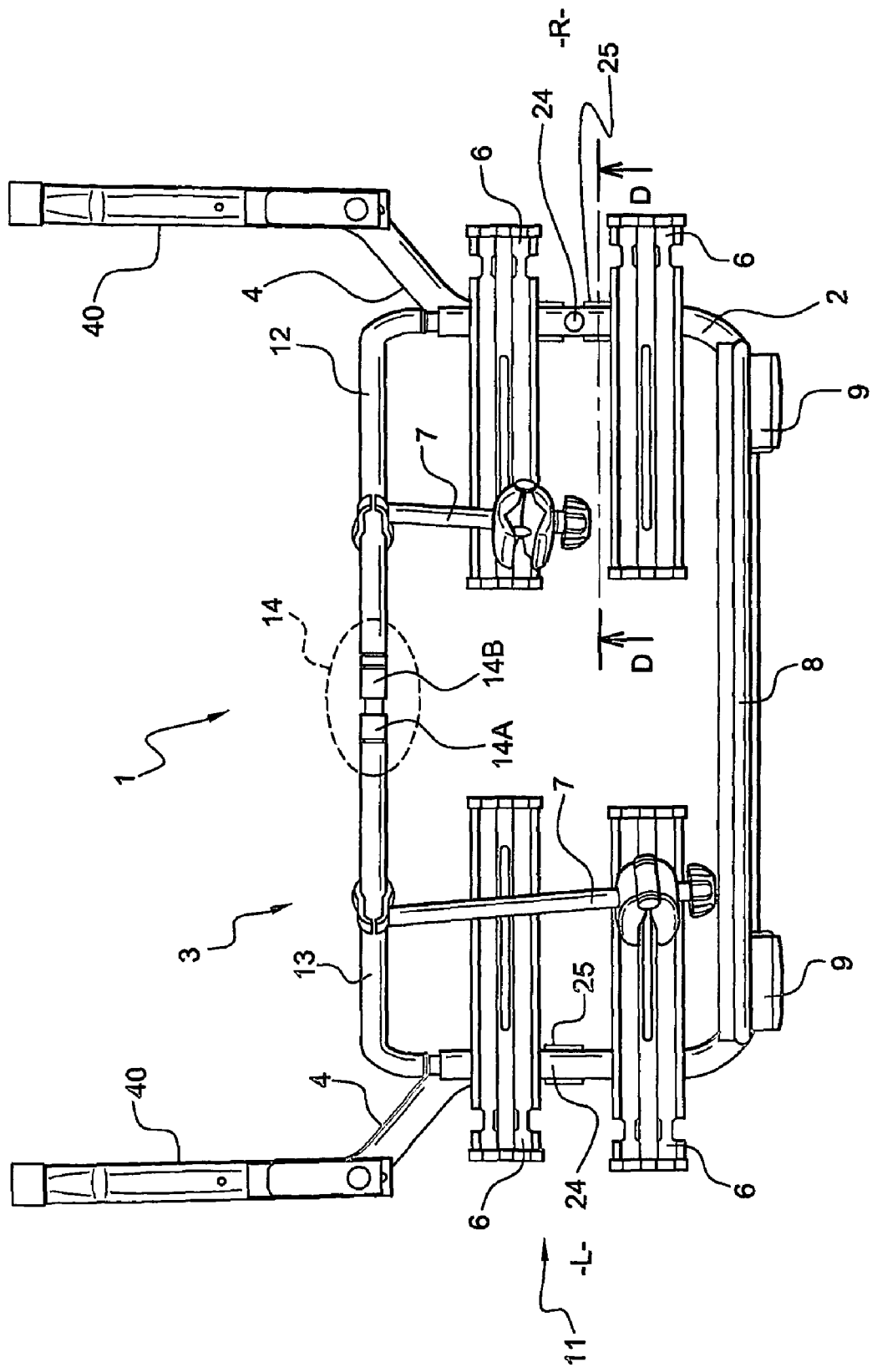
FIG. 11 is the view of FIG. 4 in which coupling members of the load carrier are in the folded-out.
Figure 12:
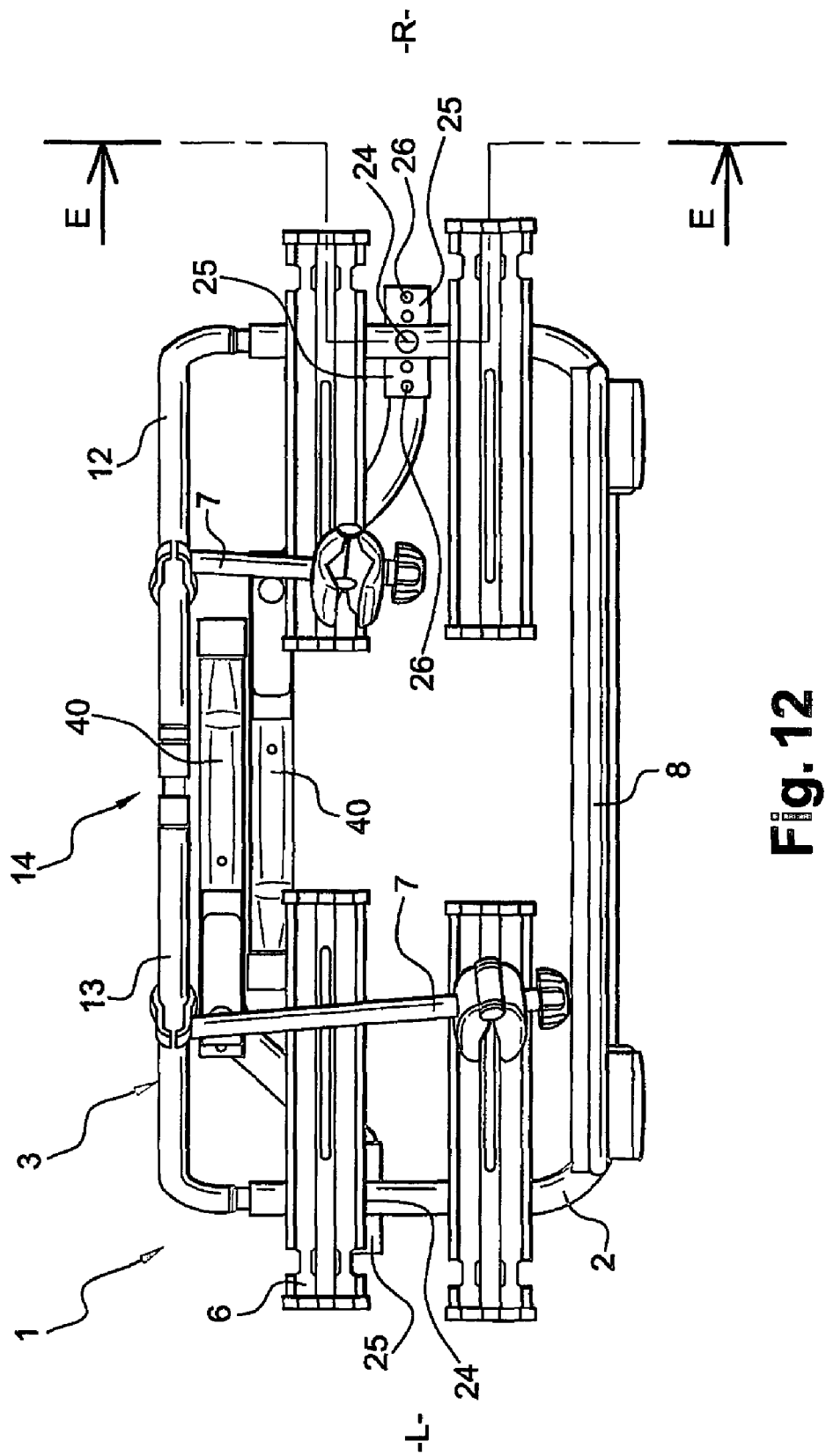
FIG. 12 is the view of FIG. 11 in which the coupling members have been pivoted into a folded-in position suitable for storage of the load carrier.
Figure 14:
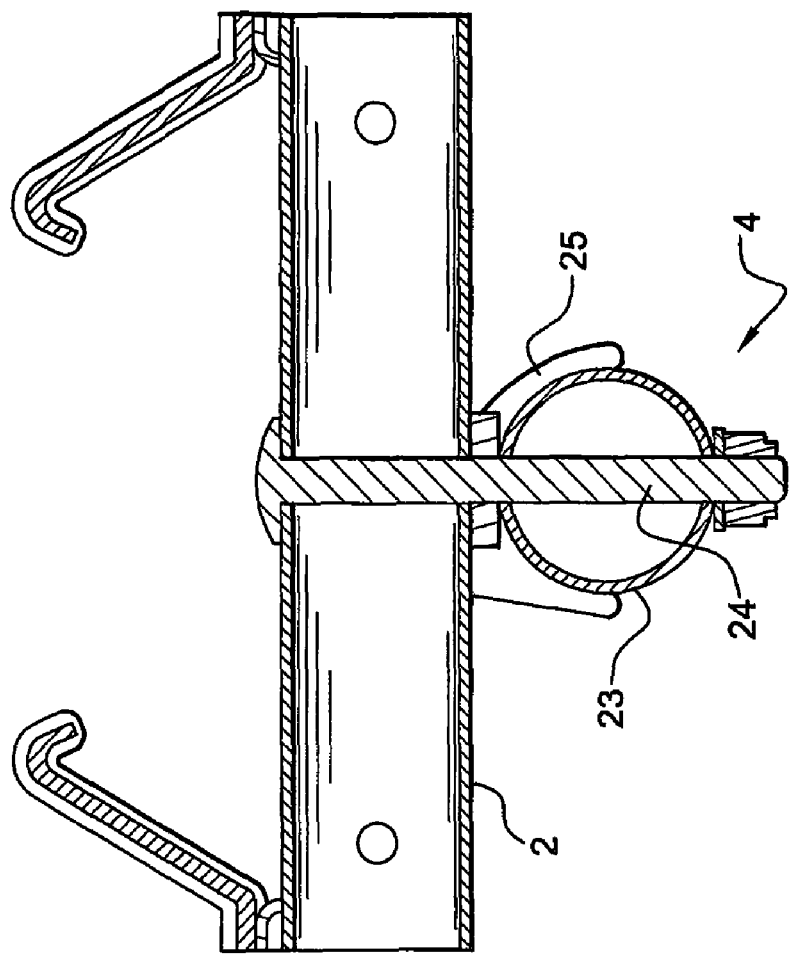
FIG. 14 is a sectional view taken from the line E-E in FIG. 12.
Figure 13:
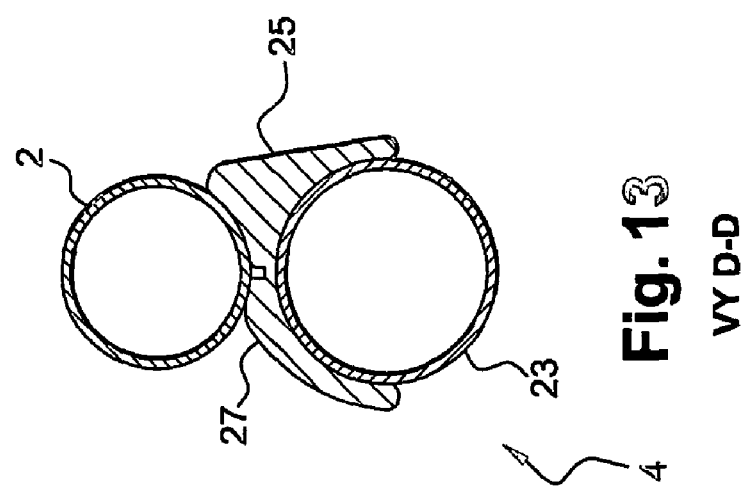
FIG. 13 is a sectional view taken from the line D-D in FIG. 11.

Fitted to the pipe part 23 on each side of the screw joint 24 is an clip in the form of an interlay 25. The interlay 25 is connected by screws 26, rivets or similar to the pipe part 23 and the interlay is shaped on the side 27 facing the loading frame 2 such that it fits tightly against the loading frame 2 when the connecting member 4 is in the folded-out position, which position is shown in FIG. 11. The interlay 25 is preferably made of a resilient material, which allows the connecting member 4 to be pivotable between the folded-out position shown in FIG. 11 and the folded-in position shown in FIG. 12. The tight fitting of the interlay 25 against the loading frame 2 has the effect that the connecting members 4, when in the folded-out position, are captured in position and are not inadvertently shifted out of this position, which makes the load carrier 1 easier to fit to the vehicle 5.

The connecting members 4 are preferably configured for stowage in an at least partially over-lapping relationship, which helps with compactness. The connecting members 4 are mounted separately by independent pivotal connections 24 and this enables them to be folded inwardly one by one to achieve the compact stowage illustrated with ease of use for the operator. It is also of note that once the connecting members are in their stowed positions, the vehicle connection end of neither projects outwards of the loading frame 2. This keeps everything compact and reduces chances of tripping the user.

The pivotal mounting 24 of the connecting members 4 is made onto opposing side members of the loading frame and is asymmetric, e.g. the right hand side mounting member 4 is mounted further back than the left hand one. This helps offset the connecting members 4 and can be useful in setting up over-lapping stowage positions, in particular when combined with asymmetric offsets to the arms forming the connecting members. The asymmetry of the connecting members 4 and their step outwards allows them to achieve a good width in the in-use position but aids compact stowage. Mounting the connecting members 4 directly onto the loading frame 2 keeps down component count, weight and cost.

When the load carrier 1 is uncoupled from the vehicle 5 to which it has been connected, the load carrier 1 is in the position which can be seen from FIGS. 1 and 4. In this position, the screw joint 14 is released and the supporting arch parts 12 and 13 are pivoted down, an intermediate stage of the folding operation being visible in particular in FIGS. 2 and 5. Due to the functioning of the shaft-sleeve arrangement (FIGS. 7 to 9), the arch parts 12, 13 shift in the lateral direction relative to each other, which means that the arch parts 12, 13 can pass each other while being pivoted down to the position shown in FIG. 10 substantially without interfering with each other or otherwise making pivot-blocking contact. The situation with a divided and fully collapsed arch 3 can be seen with particular reference to FIGS. 3 and 6.

The connecting members 4 are next folded inwards towards the middle of and beneath the loading frame 2, whereafter the lighting board 8 is rotated about its pivot edge to make bearing contact against the loading frame 2, thereby producing a fully collapsed and very compact load carrier 1 of the appearance represented in FIG. 15, which load carrier 1 requires little storage space. It may be noted that the distance arms 7 lie substantially across the loading area 11 and may be down against the tracks 6 when the load carrier is in its fully collapsed state or may lie substantially between them (e.g. as illustrated in FIG. 6). In particular, the load carrier 1 in its collapsed/storage condition does not suffer from the disadvantage felt by some prior art load carriers because the manner in which its arch 3 is divided enables its collapse into a position H in which no part of the arch 3 juts out over the back of the loading area 11. This co-operates with the similarly efficient stowage of the connecting members 4 under the loading area 11 so as to produce a very compact package for storage or transport when the load carrier 1 is not being used to carry a load.

The load carrier 1 of this or other embodiments may be supplied in the form of an original equipment part fitted to, or supplied in relation with, a new or used vehicle 5. It could also be supplied as a dealer-fit optional extra with a new vehicle or could be sold as an after-market accessory supplied as an item for hire. In one version, the load carrier 1 could be supplied in the form of a kit of parts. Such a kit of parts would preferably have included therein at least substantially all the components for assembly of a load carrier 1 according to an embodiment of the present invention.

The invention claimed is:

1. A load carrier for coupling to a vehicle, said load carrier comprising:
   a loading frame including a first arm, a second arm, and a base extending between the first arm and the second arm to form a U shape;
   connecting members connected to the loading frame to couple the load carrier to the vehicle; and
   a supporting arch that extends substantially upwardly from and transversely to said loading frame, said supporting arch being divisible into first and second arch parts, the first arch part is pivotally coupled to the first arm of said loading frame and the second arch part is pivotally coupled to the second arm of said loading frame such that the first arch part is coaxial with the first arm and the second arch part is coaxial with the second arm,
   wherein, when divided, each of said first and second arch parts is configured to be pivoted down to a storage position lying substantially level with said loading frame, and
   wherein said arch parts are configured to be interlocked substantially directly to each other into an in-use position, in which said first and said second arch parts substantially alone form said supporting arch.

2. A load carrier according to claim 1, wherein, when unlocked from said in-use position, said first and second arch parts are substantially immediately pivotable, by a single movement for each, into their respective said storage positions.

3. A load carrier according to claim 1, wherein said pivotal coupling between said arch parts and said loading frame is configured such that said arch parts, when they are pivoted, are shiftable laterally relative to each other by such a distance that said arch parts are pivotable without giving rise to pivot-blocking contact therebetween.

4. A load carrier according to claim 3, wherein said lateral shift is implemented automatically when said arch parts are pivoted.

5. A load carrier according to claim 3, wherein each said arch part is configured to shift laterally away from other arch parts when being pivoted.

6. A load carrier according to claim 1, wherein said first arm includes a groove and the first arch part includes a follower mechanism positioned in the groove such that, when said first arch part is pivoted down to the storage position, the follower mechanism interacts with the groove to move the first arm in a direction along the axis of the first arch part and the first arm into the sleeve.

7. A kit of parts configured to be assembled into a load carrier, the kit of parts comprising:
   a loading frame including a first arm, a second arm, and a base extending between the first arm and the second arm to form a U shape;
   connecting members connected to the loading frame to couple the load carrier to the vehicle; and
   a supporting arch that, when assembled onto said loading frame, extends substantially upwardly from and transversely to said loading frame, said supporting arch comprising divisible first and second arch parts, the first arch part is configured to be pivotally coupled to the first arm of said loading frame and the second arch part is pivotally coupled to the second arm of said loading frame such that the first arch part is coaxial with the first arm and the second arch part is coaxial with the second arm,
   wherein, when divided, each of said first and second arch parts is configured to pivot down to a storage position lying substantially level with said loading frame, and
   wherein said arch parts are configured to be interlocked substantially directly to each other into an in-use position in which said first and said second arch parts substantially alone form said supporting arch.

8. A load carrier according to claim 1, wherein, when said arch parts are in their respective said storage positions, said arch parts lie at least partially on top of said loading frame.

9. A load carrier according to claim 1, wherein said first arch part and said second arch part are configured to be interlocked directly to each other by closure of a manually operable coupling that comprises a first coupling part integrated with said first arch part and a second coupling part configured to co-operate with said first coupling part and integrated with said second arch part.

10. A load carrier according to claim 9, wherein said coupling comprises a manually operable quick-release coupling.

11. A load carrier according to claim 9, wherein said coupling is configured for tool-free locking or unlocking.

12. A load carrier according to claim 9, wherein said coupling comprises a screw joint.

13. A load carrier according to claim 12, wherein said screw joint comprises a male portion integrated with one said arch part and a female portion integrated with an other said arch part, said female portion being configured to substantially envelope said male portion when said screw joint is closed.

14. A load carrier according to claim 12, wherein said screw joint comprises a male portion integrated with one said arch part and a female portion integrated with an other said arch part, and wherein said female portion of said screw joint comprises a hand-grip for manual twist release of said screw joint.

15. A load carrier according to claim 1, wherein said arch parts and said loading frame comprise hollow and tubular members.

16. A load carrier according to claim 1, wherein said load carrier comprises a bicycle carrier.

17. A load carrier according to claim 1, wherein the connecting members are pivotally connected to the loading frame such that the connected members are configured to fold inwards towards a middle of and beneath the loading frame.

18. A kit of parts according to claim 7, wherein the connecting members are pivotally connected to the loading frame such that the connected members are configured to fold inwards towards a middle of and beneath the loading frame.

19. A load carrier for coupling to a vehicle, said load carrier comprising:
   a loading frame; and
   a supporting arch that extends substantially upwardly from and transversely to said loading frame, said supporting arch being divisible into first and second arch parts, each of which arch parts is pivotally coupled to said loading frame such that, when divided, each of said first and second arch parts is configured to be pivoted down to a storage position lying substantially level with said loading frame, wherein said arch parts are configured to be interlocked substantially directly to each other into an in-use position, in which said first and said second arch parts substantially alone form said supporting arch, and wherein said pivotal coupling comprises a shaft or tube portion that is rotatable in a sleeve portion, in which arrangement one of its parts defines a groove that interacts with a pin disposed in an other part and which groove has an inclination relative to the longitudinal axis of said pivotal coupling, with an effect that said parts of the shaft/tube and sleeve arrangement shift automatically relative to each other along the longitudinal axis of said pivotal coupling when said associated arch part is pivoted.

20. A load carrier according to claim 1, wherein, when said arch parts are in their respective said storage positions, said arch parts occupy substantially the same height as said loading frame.

* * * * *